US006990058B1

(12) United States Patent
Pleiss et al.

(10) Patent No.: US 6,990,058 B1
(45) Date of Patent: Jan. 24, 2006

(54) STRUCTURE AND METHOD FOR STORING DATA ON OPTICAL DISKS

(75) Inventors: Curtis M. Pleiss, Longmont, CO (US); Stanton M. Keeler, Longmont, CO (US)

(73) Assignee: DPHI Acquisitions, Inc., Boulder, CO (US)

(*) Notice: Subject to any disclaimer, the term of this patent is extended or adjusted under 35 U.S.C. 154(b) by 0 days.

(21) Appl. No.: 09/542,681

(22) Filed: Apr. 3, 2000

(51) Int. Cl.
*G11B 7/24* (2006.01)
(52) U.S. Cl. ............................................. 369/275.4
(58) Field of Classification Search ............. 369/275.1, 369/59.25, 47.35, 47.28, 275.3, 44.11, 111, 369/275.4, 44.26, 47.27, 47.22, 13.53, 13.54, 369/44.13
See application file for complete search history.

(56) References Cited

U.S. PATENT DOCUMENTS

| | | | |
|---|---|---|---|
| 4,420,828 A | 12/1983 | Yoshida et al. ............... 369/47 |
| 4,791,627 A | 12/1988 | Yonezawa .................... 369/109 |
| 4,827,462 A | 5/1989 | Flannagan et al. ............ 369/32 |
| 4,866,692 A | 9/1989 | Saito et al. .................... 369/59 |
| 4,901,300 A | 2/1990 | Van Der Zande et al. .... 369/47 |
| 4,960,680 A | 10/1990 | Pan et al. ..................... 430/346 |
| 4,972,401 A | 11/1990 | Carasso et al. ............... 369/59 |
| 4,981,743 A | 1/1991 | Ho ............................... 428/64 |
| 4,987,533 A | 1/1991 | Clark et al. .................. 364/200 |
| 5,023,854 A | 6/1991 | Satoh et al. ................... 369/32 |
| 5,023,856 A | 6/1991 | Raaymakers et al. ......... 369/32 |
| 5,029,125 A | 7/1991 | Sciupac ....................... 364/900 |
| 5,073,887 A | 12/1991 | Takagi et al. ................ 369/100 |
| 5,080,736 A | 1/1992 | Matsui .......................... 156/64 |
| 5,113,512 A | 5/1992 | Miki et al. ................... 395/425 |
| 5,210,734 A | 5/1993 | Sakurai ......................... 369/49 |
| 5,247,494 A | 9/1993 | Ohno et al. ................... 369/13 |
| 5,339,301 A | 8/1994 | Raaymakers et al. ......... 369/50 |
| 5,347,651 A | 9/1994 | Burke et al. ................. 395/600 |
| 5,377,178 A | 12/1994 | Saito et al. ................. 369/124 |
| 5,446,857 A | 8/1995 | Russ ........................... 395/427 |
| 5,448,728 A | 9/1995 | Takano et al. .............. 395/600 |

(Continued)

FOREIGN PATENT DOCUMENTS

EP  0 284 037  3/1988

(Continued)

OTHER PUBLICATIONS

Couch, Leon W. II, "Digital and Analog Communication Systems", Macmillan Publishing Company, Third Edition (1990).

(Continued)

*Primary Examiner*—Thang V. Tran
(74) *Attorney, Agent, or Firm*—Jonathan Hallman; MacPherson Kwok Chen & Heid

(57) ABSTRACT

During manufacturing of optical disks, mastering equipment inserts marks ("high frequency wobble marks" or "HFWMs") into the wobble of the groove on optical disks to store data. The presence of a HFWM at a zero crossing of the wobble indicates an active bit and the absence of the HFWM indicates an inactive bit. The zero crossing is, for example, a negative zero crossing. A matched filter is used to detect the shape of the HFWMs. If a HFWM is detected during a wobble cycle, an active bit is saved in a register or a memory. If a HFWM is not detected during a wobble cycle, an inactive bit is saved in a register or a memory. The active and inactive bits may be coded bits that must be decoded to data bits. The data bits include information such as a synchronization mark, a sector identification data, and an error detection code.

11 Claims, 7 Drawing Sheets

U.S. PATENT DOCUMENTS

| | | | | |
|---|---|---|---|---|
| 5,491,807 | A | 2/1996 | Freeman et al. | 395/401 |
| 5,539,724 | A | 7/1996 | Ohtomo | 369/275.4 |
| 5,654,947 | A | 8/1997 | Roth et al. | 369/48 |
| 5,656,348 | A | 8/1997 | Kudo et al. | 428/641 |
| 5,677,953 | A | 10/1997 | Dolphin | 380/4 |
| 5,682,365 | A | 10/1997 | Carasso et al. | 369/54 |
| 5,709,764 | A | 1/1998 | Funawatari et al. | 156/275.7 |
| 5,754,351 | A | 5/1998 | Kuen et al. | 360/48 |
| 5,754,522 | A * | 5/1998 | Kobayashi et al. | 369/275.3 |
| 5,774,440 | A | 6/1998 | Kimura et al. | 369/59 |
| 5,787,460 | A | 7/1998 | Yashiro et al. | 711/114 |
| 5,850,382 | A | 12/1998 | Koishi et al. | 369/275.3 |
| 5,874,147 | A | 2/1999 | Bojarczuk, Jr. et al. | 428/641 |
| 5,886,985 | A * | 3/1999 | Kobayashi et al. | 369/275.3 |
| 5,931,935 | A | 8/1999 | Cabrera et al. | 710/260 |
| 5,978,812 | A | 11/1999 | Inokuchi et al. | 707/200 |
| 5,999,504 | A | 12/1999 | Aoki | 369/47 |
| 6,091,686 | A | 7/2000 | Caffarelli et al. | 369/58 |
| 6,117,185 | A | 9/2000 | Schmidt | 717/9 |
| 6,125,100 | A | 9/2000 | Sensyu | 369/275.3 |
| 6,153,063 | A | 11/2000 | Yamada et al. | 204/192.22 |
| 6,160,778 | A | 12/2000 | Ito et al. | 369/54 |
| 6,243,340 | B1 | 6/2001 | Ito et al. | 369/53.19 |
| 6,351,447 | B1 | 2/2002 | Takagi et al. | 369/275.3 |
| 6,389,427 | B1 | 5/2002 | Faulkner | 707/104.1 |
| 6,452,897 | B1 | 9/2002 | Van Den Enden | 369/275.1 |
| 6,621,772 | B2 * | 9/2003 | Asano et al. | 369/44.26 |

FOREIGN PATENT DOCUMENTS

| | | |
|---|---|---|
| EP | 0 301 829 | 7/1988 |
| EP | 0 301 866 | 7/1988 |
| EP | 0 350 920 | 7/1989 |
| EP | 0 386 971 | 3/1990 |
| EP | 0 802 530 | 11/1990 |
| EP | 0 448 378 | 3/1991 |
| EP | 0 466 389 | 7/1991 |
| EP | 0 475 197 | 8/1991 |
| EP | 0 488 388 | 11/1991 |
| EP | 0 519 768 | 5/1992 |
| EP | 0 555 486 | 8/1992 |
| EP | 0 541 219 | 9/1992 |
| EP | 0 643 388 | 8/1994 |
| EP | 0 676 764 | 3/1995 |
| EP | 0 718 827 | 6/1995 |
| EP | 0 730 274 | 2/1996 |
| EP | 0 786 767 | 7/1997 |
| EP | 0786767 * | 7/1997 |
| EP | 0 840 296 | 10/1997 |
| EP | 0 969 452 | 1/2000 |
| EP | 0969452 * | 1/2000 |
| GB | 2 203 886 | 10/1988 |
| GB | 2 322 555 | 9/1998 |
| WO | WO 00/72312 | 11/2000 |
| WO | WO 00/79526 | 12/2000 |
| WO | WO 01/06510 | 1/2001 |
| WO | WO 01/06511 | 1/2001 |
| WO | WO 01/93262 | 12/2001 |

OTHER PUBLICATIONS

Peterson, W. Wesley et al., "Error-Correcting Codes", The Massachusetts Institute of Technology, Second Edition (1991).

ECMA Standardizing Information and Communiction Systems, "120 mm DVD Rewritable Disk (DVD-RAM)", Standard ECMA-272, 2$^{nd}$ Edition—Jun. 1999.

ECMA Standardizing Information and Communiction Systems, "Data Interchange on 120 mm Optical Disk using +RW Format—Capacity: 3,0 Gbytes and 6,0 Gbytes", Standard ECMA-272, 2$^{nd}$ Edition—Jun. 1999.

ECMA Standardizing Information and Communiction Systems, "80 mm (1,23 Gbytes per side) and 120 mm (3,95 Gbytes per side) DVD-Recordable Disk (DVD-R)", Standard ECMA-272, 2$^{nd}$ Edition—Jun. 1999.

PCT Written Opinion for Application No. PCT/US01/09862, Feb. 27, 2002 (2 pages).

Patent Abstracts of Japan, vol. 010, no. 198 (P-476), Jul. 11, 1986, & JP 61 039987 A (Hitachi LTD), Feb. 26, 1986, abstract.

IBM Technical Disclosure Bulletin, XP 002183288, "Defect Skipping Among Fixed Length Records in Direct Access Storage Devices", vol. 19, No. 4, Sep. 1976, pp. 1424-1426.

IBM Technical Disclosure Bulletin, XP 000588138, "Method, System and Interface for Mapping Tracks in No-ID Disk Drives", vol. 38, No. 12, Dec. 1995, pp. 275-277.

IBM Directory Maintenance VM/ESA, Diagnosis Reference, Jul. 1999, International Business Machines Corporation, Version 1, Release 5, p. 104.

ECMA: "Volume the File Structure of Read-Only and Write-Once Compact Disk Media for Information Interchange", Standard ECMA-168, 2$^{nd}$ Edition—Dec. 1994, pp. 1-128, XP002183920.

ECMA: "80 mm (1,23 Gbytes per side) and 120 mm (3,95 Gbytes per side) DVD-Recordable Dsik (DVD-R)", Standard ECMA-279, Dec. 1998. pp. 1-114, XP002183289.

Hewlett-Packard Company, "Safeguarding Data with WORM: Technologies, Processes, Legalities and Standards", 1999.

* cited by examiner

STRUCTURE AND METHOD FOR STORING DATA ON OPTICAL DISKS

BACKGROUND

1. Field of the Invention

The present invention relates to a method to store data on writeable optical disks, and more particularly to the use of marks in the wobble of the groove to store data.

2. Description of Related Art

FIG. 1 illustrates a writable optical disk that has tracks formed from a single spiral groove. The writable optical disk is, for example, a record-able CD or DVD. The spiral groove increases in diameter linearly with increasing radius in a mathematical phenomenon known as the Archimedes Spiral. The interval between turns of the spiral groove is called the track pitch and this is nominally constant for most optical disks. The groove is divided into tracks that each form a 360-degree turn of the groove. The tracks are further divided into sectors, which are the smallest units that an optical drive (including reader and writer) accesses. The optical drive keeps track of where data is stored by the data's sector number.

To determine the linear velocity of the tracks, the tracks in the writable area contain a deviation from the averaged centerline of the groove called "wobble." FIG. 2 illustrates the wobble. Optical drives measure the number of cycles during a unit of time (frequency) to determine the linear velocity of the track. Optical drives match the clocks used to write data into the tracks ("write speed") with the linear velocity of the tracks so that the written bits of data are equally spaced apart. For further details, see for example U.S. Pat. No. 4,972,401 issued to Carasso et al.

Writable optical disks must have a reliable method for reading radial and rotational positions of the tracks so that optical drives can read from and write to the appropriate locations in the tracks. Radial and rotational information may be communicated through prewritten data in the tracks called pre-embossed headers. In this addressing scheme, the mastering equipment creates the optical disks with radial and rotational information written in the groove during the manufacturing of the optical disks. This addressing scheme displaces some storage area that can be otherwise used to store user data in order to store radial and rotational information. For further details, see for example Standard ECMA-272 from ECMA located at 114 Rue du Rhône —CH-1204 Geneva Switzerland ("ECMA"), which is hereby incorporated by reference.

Radial and rotational information may also be communicated by modulating the frequency of the wobble. The wobble frequency is modulated between a first frequency and a second frequency to communicate an active or inactive bit (e.g., a "1" or a "0" bit). This addressing scheme is inefficient because multiple wobble cycles are required to convey an active or inactive bit. As FIG. 2 illustrates, the wobble may include periodic occurrences of square waves called "Alternating Fine Clock Marks" ("AFCMs") that provides timing information. Each AFCM has an amplitude 3.5 to 7 times greater than the amplitude of the wobble. Each AFCM is inverted from the AFCM in the adjacent tracks. The AFCMs are spaced equally apart around the tracks to provide timing information. For further details, see for example Standard ECMA-274 from ECMA, which is hereby incorporated by reference.

Radial and rotational information may further be communicated through a series of pits ("land pre-pits") on the land areas between the tracks. Land pre-pits create cross talk into the data because optical drives detect the land pre-pits in the land areas between the tracks. Closely aligned land pre-pits in adjacent tracks also create cancellation problems as their presence cancels their detection by optical drives. Land pre-pits further require a 2-beam mastering system that can generate the groove and the land pre-pits simultaneously during the mastering of the optical disks. For further details, see for example Standard ECMA-279 from ECMA, which is hereby incorporated by reference.

A master optical disk is formed by coating a glass substrate with a photoresist, exposing the photoresist to a laser beam recorder, developing the photoresist, removing the photoresist, and coating the remaining material with a thin seed-layer of metal to form the master optical disk. These steps are known as "mastering". A stamper is made by electroplating nickel onto the master and removing the nickel from the master to form the stamper. These steps are known as "electroforming". Optical disks are produced from the stamper by placing the stamper in a mold cavity of an injection molding press and injecting molten plastic into the mold. The resulting molded disks have an imprint of the stamper. These steps are known as "molding". The molded disks are then coated with a variety of thin films (e.g., reflective layers, active layers, overcoats) depending on their type. The molded disks can be coated by a variety of methods, such as sputtering, spin coating, and chemical vapor deposition (CVD). Manufacturers of optical disks include Ritek of Taiwan, Sony of Japan, Matsushita of Japan, and Imation of Oakdale, Minn.

SUMMARY

Marks ("high frequency wobble marks" or "HFWMs") in the wobble of the groove on an optical disk are used to store data. The presence of a HFWM at a negative zero crossing of the wobble indicates an active bit while the absence of a HFWM at a negative zero crossing of the wobble indicates an inactive bit. Alternatively, the presence of a HFWM at a positive zero crossing of the wobble indicates an active bit while the absence of a HFWM at a positive zero crossing of the wobble indicates an inactive bit. A matched filter outputs an active signal to a decoder logic when the matched filter detects the shape of a HFWM. The decoder logic records an active bit when it receives an active signal from the matched filter. If the logic device does not receive an active signal from the matched filter within a wobble cycle, the logic device records an inactive bit. The stored bits include information such as a synchronization mark used for timing, physical sector information including a physical sector address, and an error correction code for correcting misread of the physical sector information.

Other aspects and advantages of the present invention will become apparent from the following detailed description and accompanying drawings.

BRIEF DESCRIPTION OF THE DRAWINGS

Use of the same reference symbols in different drawings indicates similar or identical items.

DETAILED DESCRIPTION

In accordance with one aspect of the invention, the presence of a mark in a wobble cycle ("high frequency wobble mark" or "HFWM") indicates an active bit (e.g., a "1" bit) and the absence of a HFWM indicates an inactive bit (e.g., a "0" bit). The active and inactive bits ("HFWM bits") are decoded to generate data bits. During the manufacturing of an optical disk, a conventional mastering equipment inserts the HFWMs in the wobble of the tracks to save data such a synchronization mark, physical sector information, and an error correction code. The conventional mastering equipment can make a conventional disk stamper from the above-described optical disk and use the conventional disk stamper to make optical disks in large quantity. The optical disk includes, for example, a small optical disk 32 mm in diameter. Optical drives read the synchronization mark and the physical sector information from optical disks to determine the appropriate sectors for read and write operations. Optical drives read the error correction code to detect and correct errors from the reading of the physical sector information.

Figure 1:
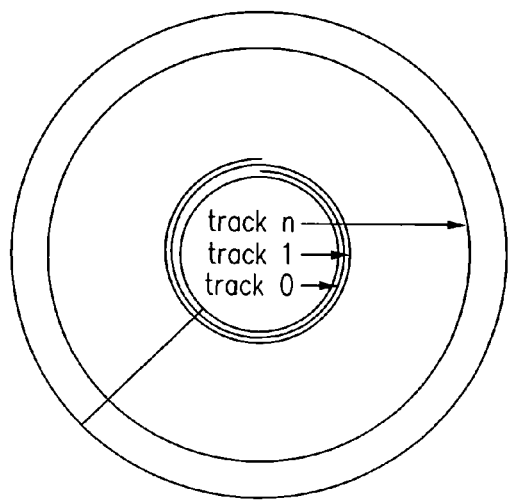
FIGS. 1 and 2 illustrate a groove in a prior art optical disk.
Figure 2:
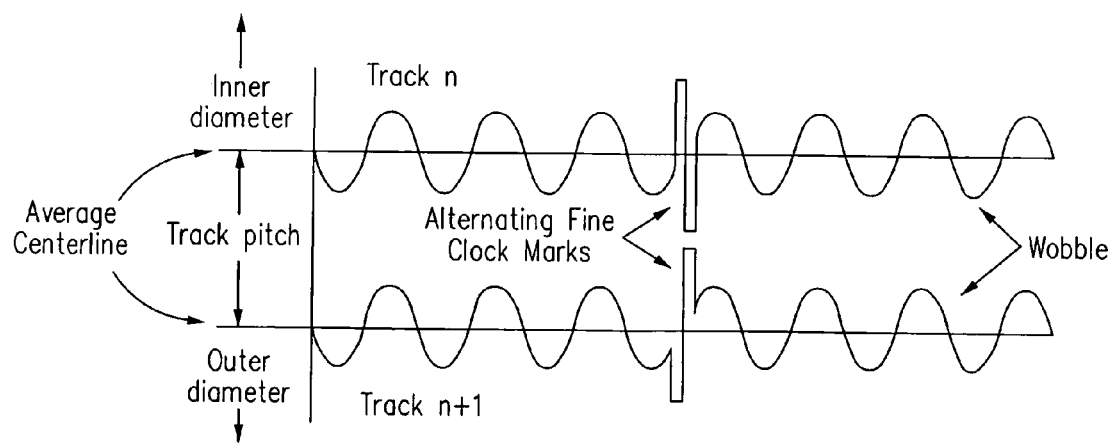
Figure 3:
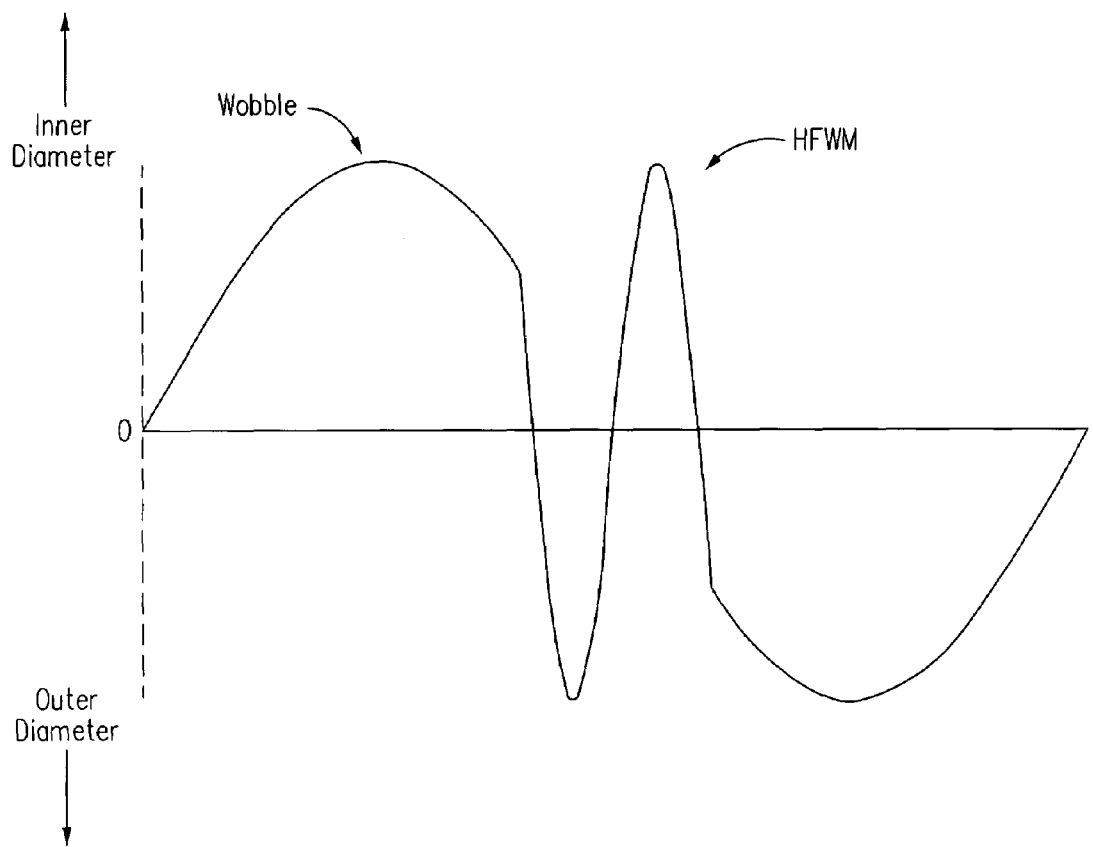
FIG. 3 illustrates a high frequency wobble mark in accordance to one embodiment of the present invention.

In one embodiment illustrated in FIG. 3, HFWMs have a sinusoidal shape with an amplitude equal to the amplitude of the wobble. The amplitude is, for example, 20 nanometers from peak to peak. Each sector of the optical disk includes, for example, 248 wobble cycles. Thus, 248 HFWM bits may be inserted into the wobble cycles.

Figure 4:
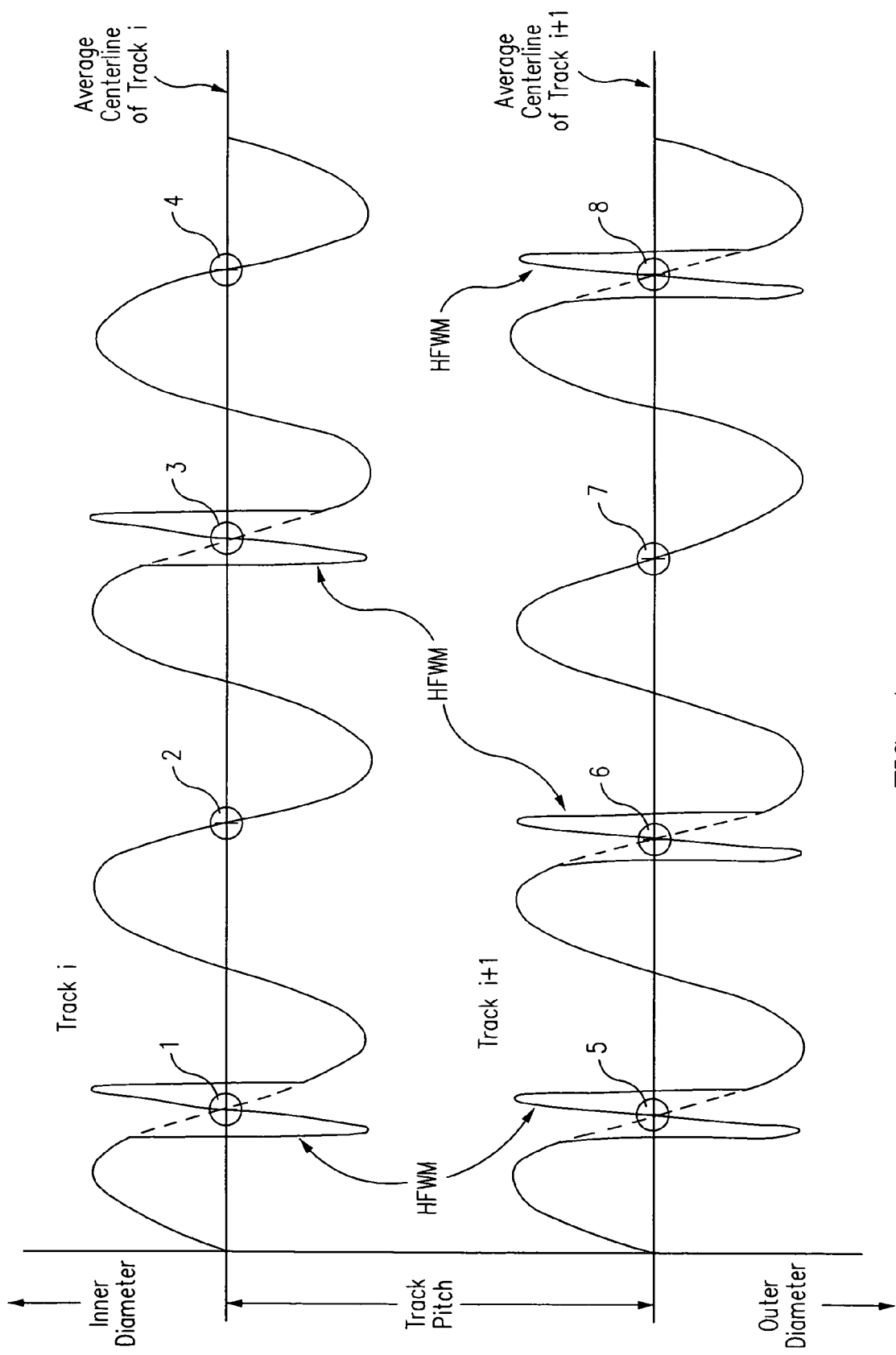
FIG. 4 illustrates high frequency wobble marks in adjacent tracks.

In one implementation illustrated in FIG. 4, the mastering equipment inserts HFWMs at points on the optical disk where the wobble would cross the centerline of the tracks from a region closer to the inner diameter to a region closer to the outer diameter ("negative zero crossings"). In FIG. 4, the would-be paths of the wobble without the HFWMs are illustrated as dashed lines. The negative zero crossings are labeled as crossings 1 through 4 for track i and crossings 5 to 8 for track i+n. In this implementation, the absence of HFWMs at negative zero crossings indicate inactive HFWM bits. In this implementation, optical drives detect the positive zero crossings of the wobble to determine wobble cycles, the wobble frequencies, and the linearly velocities of the tracks.

In another implementation, the mastering equipment inserts HFWMs at points on the optical disk where the wobble would cross the centerline of the tracks from a region closer to the outer diameter to a region closer to the inner diameter ("positive zero crossings"). In this implementation, the absence of HFWMs at positive zero crossings indicate inactive HFWM bits. In this implementation, optical drives detect the negative zero crossings of the wobble to determine the wobble cycles, wobble frequencies, and the linear velocities of the tracks.

The HFWMs may have a frequency, for example, three to five times the frequency of the wobble. It is preferred to choose a frequency that is far from the frequencies of the data so there is less cross talk between HFWM detection and data detection. The HFWMs cannot have the same frequency as the wobble because optical drives will not be able to detect the zero crossings of the wobble to determine the wobble cycles, the wobble frequencies, and the linear velocities of the tracks. The HFWMs cannot have a frequency that is too large because the mastering equipment may not have the precision to generate the shape of such HFWMs. The frequency limit of the mastering equipment is, for example, $10^6$ Hz. Furthermore, optical drives may not have the precision to detect such HFWMs.

In one implementation, each HFWM is in phase with the HFWMs in adjacent tracks. Since the amplitude of the HFWMs is no greater than the amplitude of the wobble, the cross talk between HFWMs in adjacent tracks is no greater than the cross talk between the wobbles of the tracks. Using HFWMs that are in phase allows simpler manufacturing processes as compared to using marks that are not in phase with adjacent marks.

Figure 5:
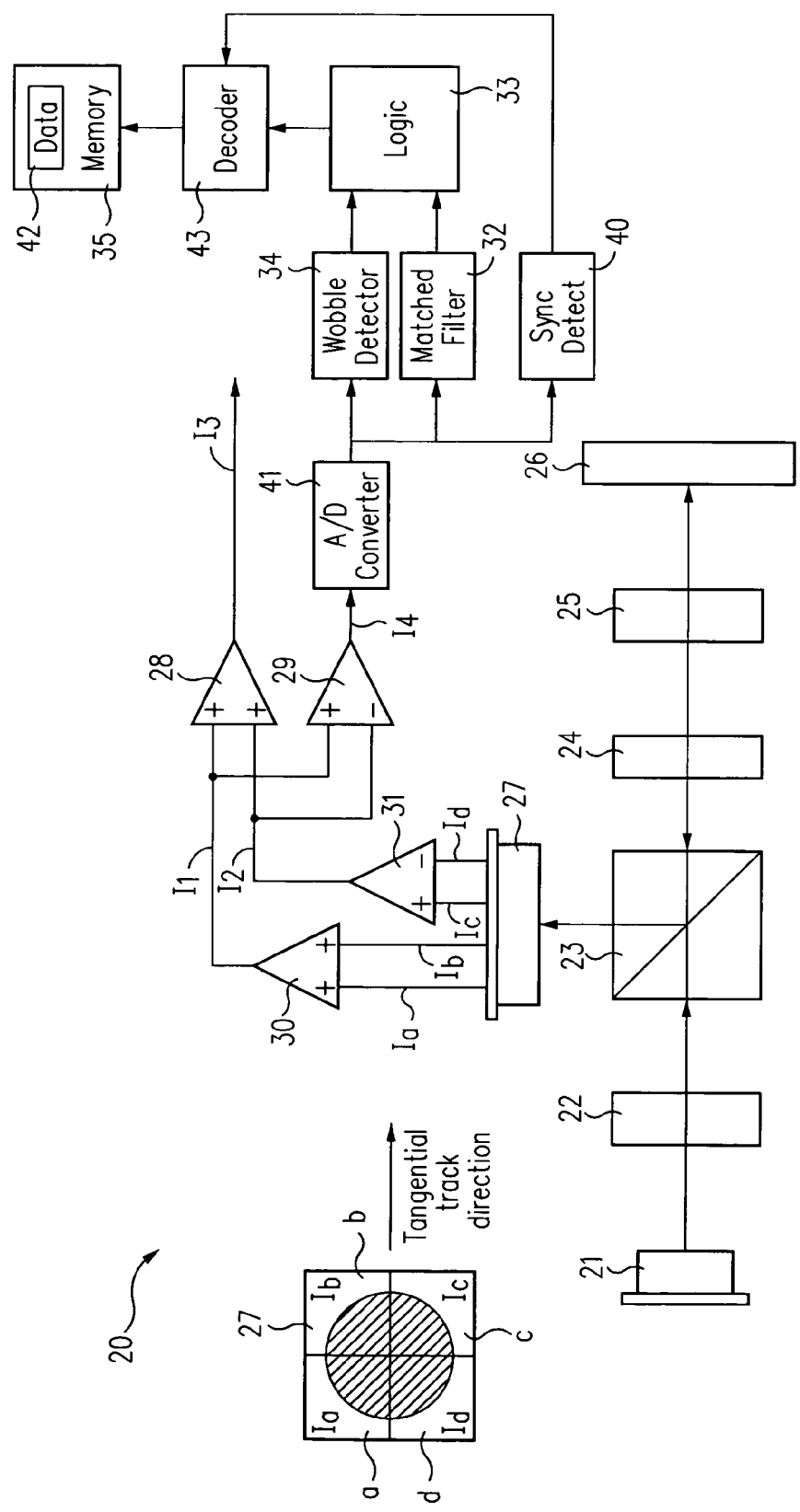
FIG. 5 is a block diagram illustrating an optical drive that detects the high frequency wobble marks of FIG. 2.

FIG. 5 illustrates a schematic diagram of an optical drive 20. Optical drive 20 includes a laser diode 21 that emits concentrated light that passes through a collimator lens 22, a polarizing beam splitter 23, a quarter-wave plate 24, and an objective lens 25. The light is reflected off an optical disk 26 and, with its polarization changed by passing twice through quarter-wave plate 24, is deflected by polarizing beam splitter 23 to a photo detector 27. Laser diode 21, collimator lens 22, polarizing beam splitter 23, quarter-waveplate 24, objective lens 25, and photo detector 27 are collectively called an optical pickup unit (OPU).

FIG. 5 also provides a top view of the photo detector 27. Photo detector 27 outputs, for example, currents Ia, Ib, Ic, and Id according to the intensity of the light that is detected in each of four quadrants a, b, c, and d of photo detector 27. The intensity of the light varies due to the wobble of the track. For example, as optical disk 26 spins and a peak of the wobble passes through quadrants a and b, the sum of currents Ia and Ib (i.e., current I1) reaches a maximum as light is reflected into quadrants a and b. Similarly, when a valley of the wobble passes through quadrants c and d, the sum of currents Ic and Id (i.e., current I2) reaches a maximum as light is reflected into quadrant c and d. The maximum of current I1 is 180 degrees out of phase with the maximum of current I2. Of course, a photo detector with a different number of elements and output currents may be used.

A direct current coupled amplifier 30 adds currents Ia and Ib and outputs current I1. A direct current coupled amplifier 31 adds the currents Ic and Id and outputs current I2. A direct current coupled amplifier 28 adds currents I1 and I2 and outputs a current I3, which represents the data that is stored on a track. A direct current coupled amplifier 29 subtracts current I2 from current I1 and outputs a current I4, which represents the wobble of the track. The output of direct current coupled amplifier 29 is coupled to an analog-to-digital converter 41. Analog-to-digital converter 41 converts the amplitude of current I4 to discrete values at a specified interval, thereby creating a stream of digital values. Analog-to-digital converter 41 passes these values to a matched filter 32, a wobble detector 34, and a synchronization detector 40.

Matched filter 32 processes the stream of digital values to look for a HFWM mark. When matched filter 32 finds a HFWM mark, matched filter 32 outputs an active signal (e.g., a pulse) to a logic 33 (described later) for conversion to a HFWM bit. Matched filter 32 is known to one skilled in the art and is for example described in "Digital and Analog Communication Systems" by Leon W. Couch II, 1990, p. 497 to 508.

Wobble detector 34 processes the stream of digital values to extract the wobble frequency. Wobble detector 34 phase locks to the wobble frequency and generates a square wave clock signal. Wobble detector 34 passes this clock signal to logic 33, which uses the clock signal and the signals from matched filter 32 to extract the HFWM bits (described later). A decoder 43 also uses this clock signal to divide the HFWM bits into frames of encoded bits that decoder 43 decodes to data bits according to the coding scheme described below in reference to Tables 1 and 2.

Synchronization detector 40 processes the input digital stream to look for the synchronization pattern that is encoded at the start of each information field (described later). When synchronization detector 40 finds the synchronization pattern, it outputs an active signal (e.g., a pulse) to decoder 43, indicating to decoder 43 to start decoding the HFWM bits to data bits, build the resulting data bits into data bytes 42, and store data bytes 42 in a memory 35 for later use by a system microprocessor.

Figure 6:
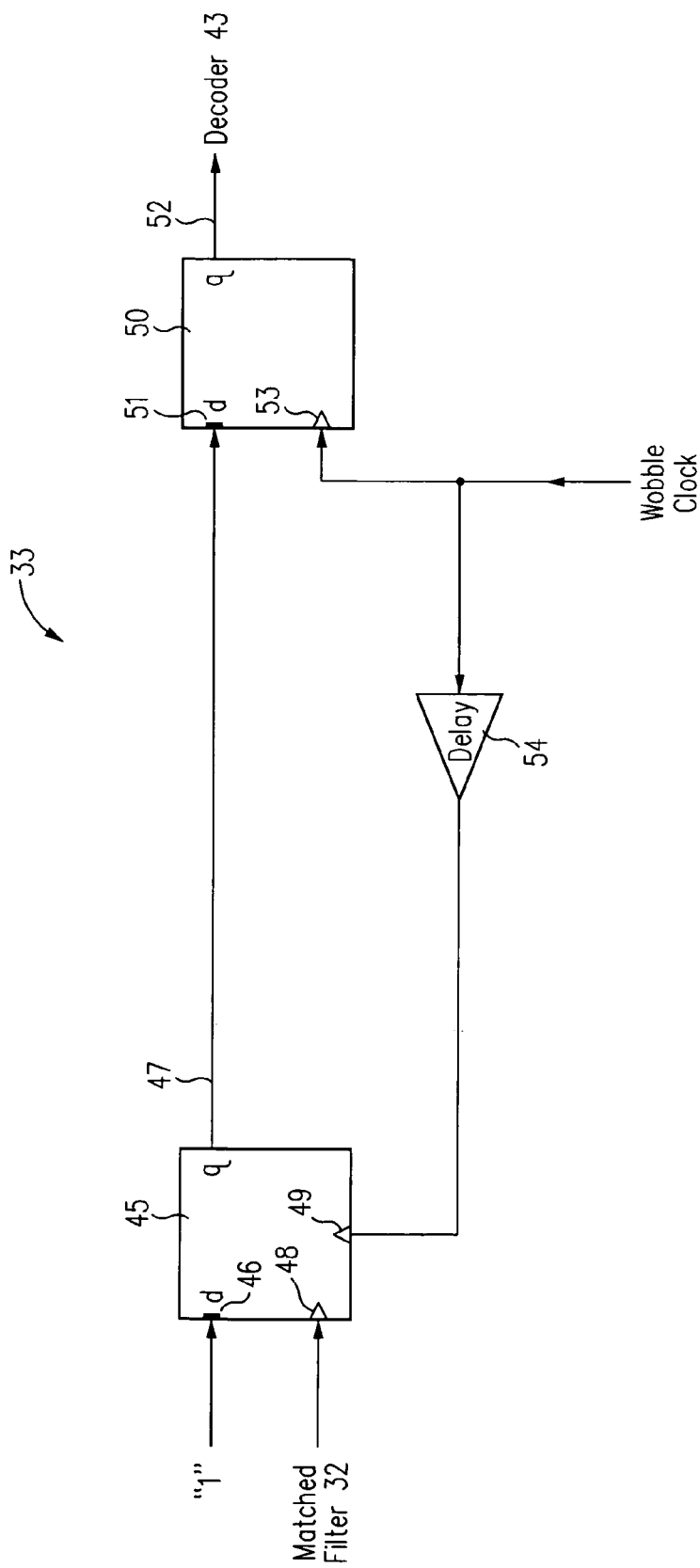
FIG. 6 illustrates a schematic of logic 33 of FIG. 5.

FIG. 6 illustrates one embodiment of logic 33. Logic 33 includes a D flip-flop 45 that has its data input terminal 46 coupled to an active signal (e.g., a "1") and its clock input terminal 48 coupled to the output line of matched filter 32. Thus, each time matched filter 32 detects a HFWM and outputs an active signal, D flip-flop 45 outputs an active signal onto its output line 47.

D flip-flop 45 also has a reset input terminal 49 coupled to the wobble clock signal from wobble detector 34, which is delayed by a buffer 54. Thus, a delayed active wobble clock signal resets D flip-flop 45. Once reset, D flip-flop 45 outputs an inactive signal (e.g., a "0") until it receives another active signal at its clock input terminal 48 from matched filter 32.

Output line 47 of D flip-flop 45 is coupled to a data input terminal 51 of a D flip-flop 50. On receipt of an active wobble clock signal from wobble detector 34 on clock input terminal 53, D flip-flop 50 outputs the data it receives on terminal 51 from D flip-flop 45 to an output line 52 to decoder 43. Decoder 43 decodes the data it receives from D flip-flop 50 to data bits.

Figure 7:
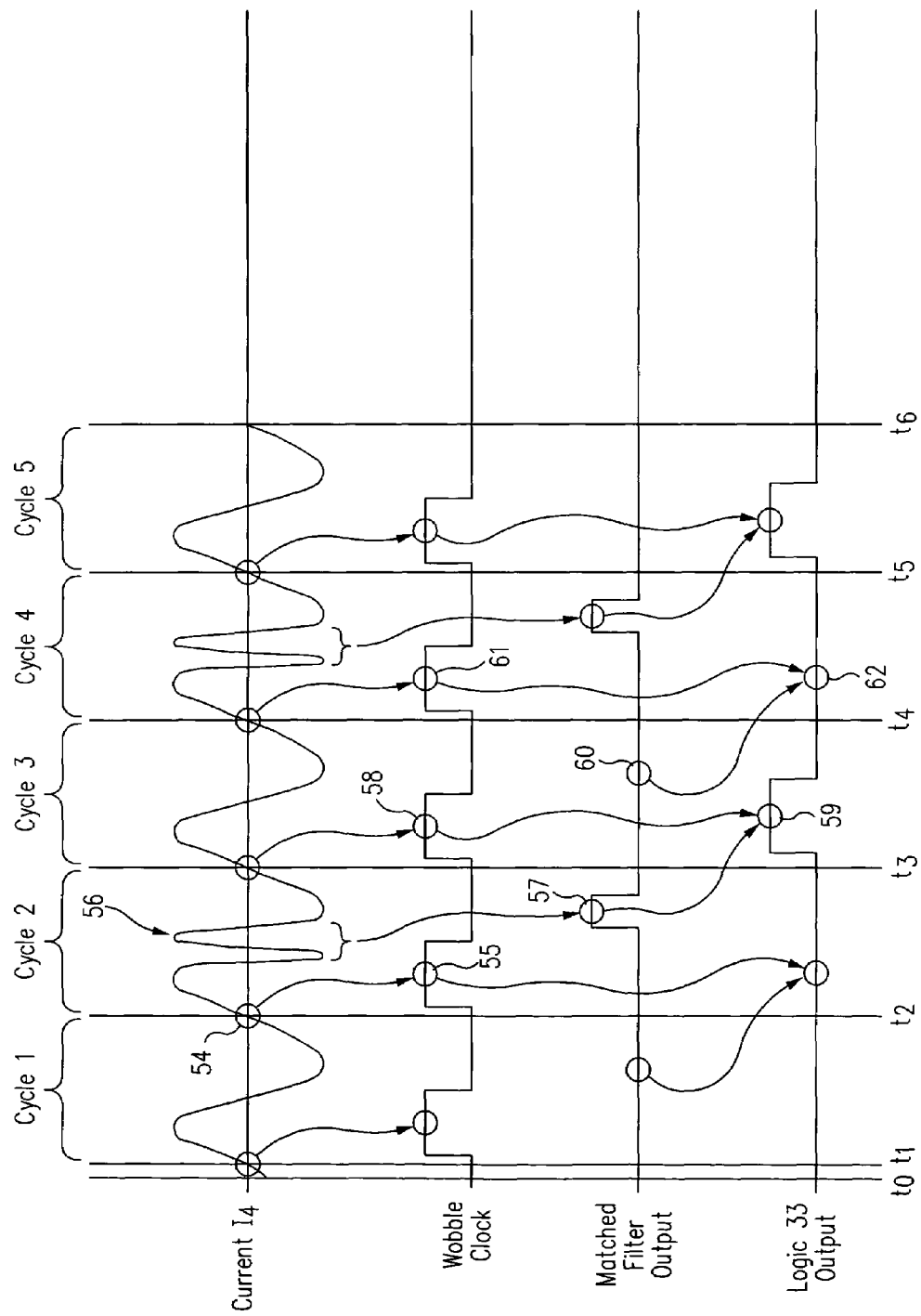
FIG. 7 illustrates a timing diagram of matched filter 32, logic 33, and wobble detector 34 of FIG. 5.

FIG. 7 illustrates a timing diagram highlighting the operations of matched filter 32, wobble detector 34, and logic 33. Current I4 represents the wobble of the groove. As FIG. 7 illustrates, the wobble goes through cycles 1 to 5 respectively from t1 to t2, t2 to t3, t3 to t4, t4 to t5, and t5 to t6. Each time wobble detector 34 detects a rising edge in the wobble, wobble detector 34 generates an active wobble clock signal. For example in cycle 2, wobble detector 34 outputs an active wobble clock signal 55 in response to a rising edge 54.

Each time matched filter 32 detects a HFWM mark in the wobble, matched filter 32 outputs an active signal. For example in cycle 2, matched filter 32 outputs an active signal 57 when it detects HFWM 56. Each time logic 33 receives an active wobble clock signal, logic 33 outputs an active signal if it has received an active signal from matched filter 32 in the last wobble cycle. For example in cycle 2, D flip-flop 45 of logic 33 (FIG. 6) receives an active signal 57 at clock terminal 48 and thus outputs an active signal on line 47 to terminal 51 of D flip-flop 50. D flip-flop 45 continues to output the active signal on line 47 until it is reset. In cycle 3, D flip-flop 50 outputs an active signal 59 because it receives wobble clock signal 58 at clock terminal 53 and the active signal from line 47 at data terminal 51. A delayed wobbled clock signal 58 resets D flip-flop 45. After being reset in cycle 3, D flip-flop 45 receives an inactive signal 60 from matched filter 32 at clock terminal 48 and thus outputs an inactive signal on line 47 to terminal 51 of D flip-flop 50. In cycle 4, D flip-flop 50 outputs an inactive signal 62 because it receives wobble clock signal 61 at clock terminal 53 and an inactive signal from D flip-flop 45 at data terminal 51.

Figure 8:
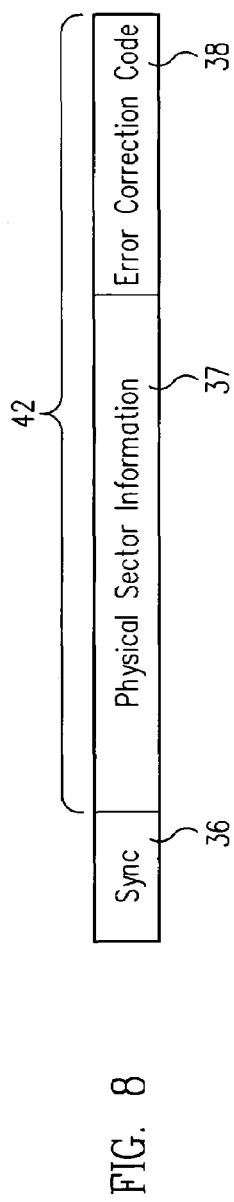
FIG. 8 illustrates the data stored by high frequency wobble marks of FIG. 2.

FIG. 8 illustrates the information stored as HFWM bits. This information includes a synchronization mark 36, physical sector information 37, and a conventional error correction code 38, collectively known as an information field. Physical sector information 37 includes a unique physical sector address. Physical sector information 37 is, for example, 4 bytes. Error correction code 38 is, for example, 2 bytes. The error correction code is, for example, ID error detection code ("IED") well understood by one skilled in the art and described in Section 13.1.2 of Standard ECMA-274.

The system microprocessor that controls optical drive 20 reads data bytes 42 in memory 35 to read physical sector information 37. The system microprocessor uses the detection of synchronization mark 36 and the read of physical sector information 37 to read from and write to the appropriate sectors on optical disk 26. The system microprocessor uses the error correction code to detect and correct errors from the read of the physical sector address. Alternatively, a hardware instead of the system microprocessor can be used to detect and correct errors in physical sector information 37.

In one implementation, a data bit is encoded in two consecutive HFWM bits (e.g., a 2-bit frame of HFWM bits) in accordance with Table 1.

TABLE 1

| HFWM Bits | Data Bit |
|---|---|
| 10 | 0 |
| 01 | 1 |

In this implementation, a synchronization mark is identified by the following sequence of HFWM bits: 00001111.

In another implementation, mastering equipment uses an encoding scheme to change each 4 data bits to 15 code bits (e.g., a 15 bit frame of HFWM bits) where the 15 code bits are selected from a maximum length binary sequence (MLBS) generated from a four bit primary polynomial of "1001". MLBS is known to one skilled in the art and is for example described in "Error-Correcting Codes" by Peterson et al., 1991, p. 222 to 223. By using 15 code bits selected from a MLBS, the chances of reading error are reduced as the 15 code bits are distinctly different from one and another. Table 2 illustrates frames of code bits generated from the MLBS and the data bits they represent. A negative sign before the code name designates a frame of code bits generated by inverting the frame of code bits of a corresponding positive code name.

TABLE 2

| Data Bit Values | Code Bits | Code Name |
|---|---|---|
| 0000 | 010110010001111 | V0 |
| 0001 | 110101100100011 | V2 |
| 0010 | 111101011001000 | V4 |
| 0011 | 001111010110010 | V6 |
| 0100 | 100011110101100 | V8 |
| 0101 | 001000111101011 | V10 |
| 0110 | 110010001111010 | V12 |
| 0111 | 101100100011110 | V14 |
| 1000 | 101001101110000 | −V0 |
| 1001 | 001010011011100 | −V2 |
| 1010 | 000010100110111 | −V4 |
| 1011 | 110000101001101 | −V6 |
| 1100 | 011100001010011 | −V8 |

TABLE 2-continued

| Data Bit Values | Code Bits | Code Name |
|---|---|---|
| 1101 | 110111000010100 | −V10 |
| 1110 | 001101110000101 | −V12 |
| 1111 | 010011011100001 | −V14 |

During manufacturing of optical disks, the mastering equipment uses code bits from Table 2 to encode HFWM bits for identification data 37 and error correction code 38 in the wobble. In one implementation, a 63 bit MLBS is generated from a six bit primary polynomial of "100001". This 63 bit MLBS is used as synchronization mark 36. The 63 bit MLBS is, for example, "010101100110-111011010010011100010111100101000110000100000111-111". By using a different MLBS for synchronization mark 36, the encoded identification data 37 and error correction code 38 are less likely to be read as synchronization mark 36. One skilled in the art will recognize that other MLBS may be used. Furthermore, other encoding schemes may be used to decrease the chances of reading error.

Figure 9:
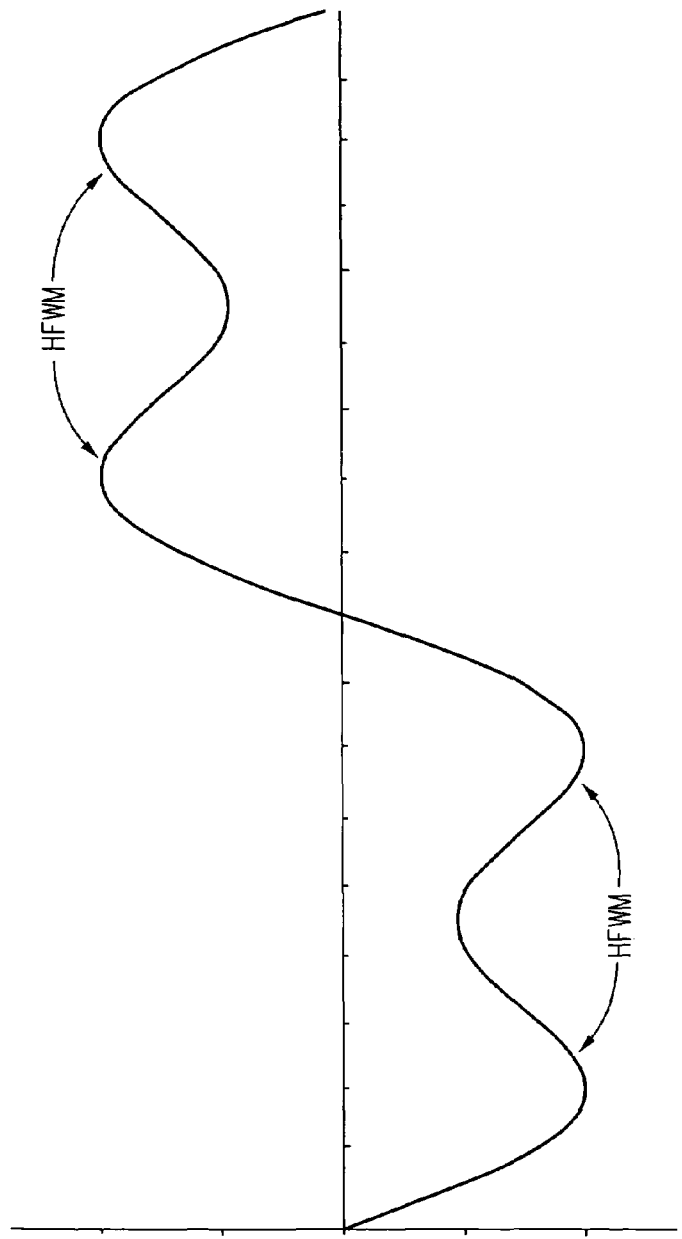
FIG. 9 illustrates high frequency wobble marks in accordance to one embodiment of the present invention.

In one implementation illustrated in FIG. 9, multiple HFWMs are inserted into a single wobble cycle. For example, three HFWMs are inserted into a single wobble cycle. In this implementation, matched filter 32 is programmed to detect (match) the shape of the three HFWMs and output an active signal.

Although the invention has been described with reference to particular embodiments, the description is only an example of the invention's application and should not be taken as a limitation. In particular, other waveforms of HFWMs can be used. In addition, other types of encoding schemes may be used to encode the data. Various other adaptations and combinations of features of the embodiments disclosed are within the scope of the invention as defined by the following claims.

We claim:

1. A spiral groove in an optical disk comprising:
a wobble, the wobble being a sinusoidal deviation from the centerline of the groove; and
a first plurality of sinusoidal marks located at zero crossings of the wobble, each sinusoidal mark being formed from a sinusoidal deviation of the groove;
wherein the presence of one of the first plurality of sinusoidal marks at one of the zero crossings represents an active bit and the absence of one of the first plurality of sinusoidal marks at one of the zero crossings represents an inactive bit, a plurality of the active bits and the inactive bits encoded to form an information field including at least address information.

2. The groove of claim 1, wherein the first plurality of sinusoidal marks has the same amplitude as the wobble.

3. The groove of claim 1, wherein the first plurality of sinusoidal marks has a frequency greater than the frequency of the wobble.

4. The groove of claim 3, wherein the first plurality of sinusoidal marks has a frequency 3 to 5 times the frequency of the wobble.

5. The groove of claim 1, further comprising a second plurality of sinusoidal marks located at zero crossings of the wobble having a different phase than the first plurality of sinusoidal marks.

6. The groove of claim 1, further comprising a second plurality of sinusoidal marks located at zero crossings of the wobble having the same phase as the first plurality of sinusoidal marks.

7. The groove of claim 6, wherein first plurality of sinusoidal marks and the second plurality of sinusoidal marks are adjacent to each other such that they are aligned in a radial direction.

8. The groove of claim 1, wherein the zero crossings are negative zero crossings.

9. The groove of claim 1, wherein the zero crossings are positive zero crossings.

10. The groove of claim 1, further comprising more than one sinusoidal mark in a single cycle of the wobble.

11. The groove of claim 1, wherein the address information includes at least a synchronization mark, a sector information, and an error correction code.

* * * * *